(12) United States Patent
Johnson et al.

(10) Patent No.: US 7,077,011 B2
(45) Date of Patent: *Jul. 18, 2006

(54) APPARATUS AND METHOD FOR MEASURING STRESS AT AN INTERFACE

(75) Inventors: Mont A. Johnson, Perry, UT (US); Randy L. Everton, Brigham City, UT (US)

(73) Assignee: Alliant Techsystems Inc., Edina, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/763,486

(22) Filed: Jan. 23, 2004

(65) Prior Publication Data

US 2004/0149045 A1    Aug. 5, 2004

Related U.S. Application Data

(63) Continuation of application No. 10/016,479, filed on Dec. 7, 2001, now Pat. No. 6,776,049.

(51) Int. Cl.
*G01N 3/24* (2006.01)

(52) U.S. Cl. .......................................... 73/841; 73/760

(58) Field of Classification Search .................. 73/800, 73/813, 826, 790
See application file for complete search history.

(56) References Cited

U.S. PATENT DOCUMENTS

| | | |
|---|---|---|
| 4,155,265 A | 5/1979 | Pickett et al. |
| 4,360,247 A | 11/1982 | Beasley |
| 4,420,251 A | 12/1983 | James et al. |
| 4,603,252 A | 7/1986 | Malek et al. |
| 4,609,816 A | 9/1986 | Severin |
| 4,623,813 A | 11/1986 | Naito et al. |
| 4,634,858 A | 1/1987 | Gerdt et al. |
| 4,692,610 A | 9/1987 | Szuchy |
| 4,733,068 A | 3/1988 | Thiele et al. |
| 4,751,849 A | 6/1988 | Paros et al. |
| 4,763,531 A | 8/1988 | Dietrich et al. |
| 4,836,030 A | 6/1989 | Martin |
| 4,862,757 A | 9/1989 | Dahl |
| 4,912,355 A | 3/1990 | Noel et al. |
| 5,033,309 A | 7/1991 | Wycherley et al. |
| 5,084,615 A | 1/1992 | Tracey |
| 5,182,449 A | 1/1993 | Johnson et al. |
| 5,202,939 A | 4/1993 | Belleville et al. |
| 5,265,475 A | 11/1993 | Messinger et al. |
| 5,392,117 A | 2/1995 | Belleville et al. |
| 5,553,500 A | 9/1996 | Grahn et al. |
| 5,627,637 A | 5/1997 | Kapteyn |
| 5,649,035 A | 7/1997 | Zimmerman et al. |

(Continued)

FOREIGN PATENT DOCUMENTS

EP       0742597 A1    11/1996

(Continued)

*Primary Examiner*—Edward Lefkowitz
*Assistant Examiner*—Andre Allen
(74) *Attorney, Agent, or Firm*—TraskBritt

(57) ABSTRACT

An apparatus for measuring stress is provided that includes a stress sensor including, in part, a sensing device configured for generating and outputting sensor measurement signals representative of a stress or a component of a stress. In one embodiment, the stress sensor permits sensing and measurement of a shear component of a stress substantially exclusive of a normal component thereof. The stress sensor may be suited for measuring stress between mated bodies, such as at an interface between the mated bodies. A method of measuring stress using the stress sensor and a rocket motor including at least one stress sensor are also provided.

22 Claims, 6 Drawing Sheets

U.S. PATENT DOCUMENTS

| | | |
|---|---|---|
| 5,841,034 A | 11/1998 | Ball |
| 5,896,191 A | 4/1999 | Beier et al. |
| 6,069,985 A | 5/2000 | Albin et al. |
| 6,094,906 A | 8/2000 | Singer et al. |
| 6,173,091 B1 | 1/2001 | Reich |
| 6,339,958 B1 | 1/2002 | Tsui et al. |
| 2003/0000314 A1 | 1/2003 | Smith et al. |

FOREIGN PATENT DOCUMENTS

| | | |
|---|---|---|
| JP | 10-239176 | 9/1998 |
| JP | 2000-136970 A | 5/2000 |

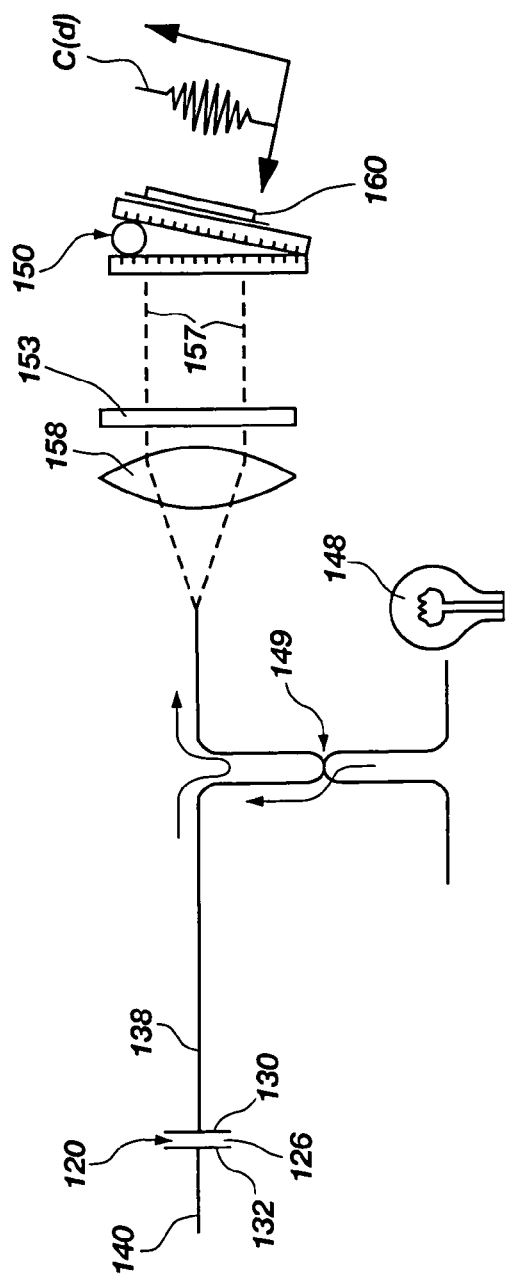
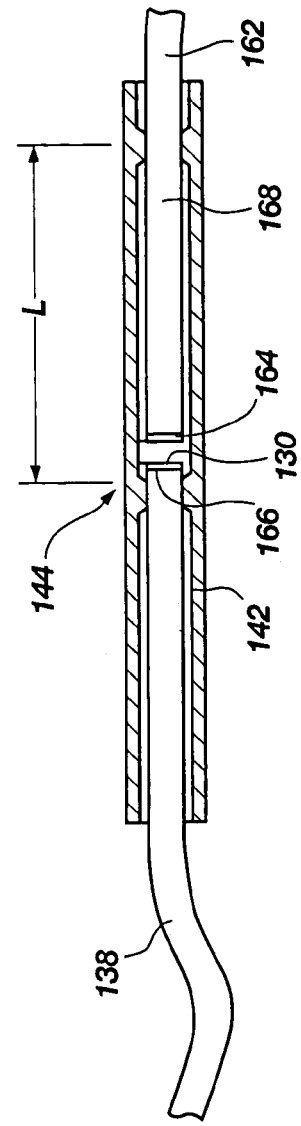
FIG. 8
FIG. 9

APPARATUS AND METHOD FOR MEASURING STRESS AT AN INTERFACE

CROSS-REFERENCE TO RELATED APPLICATION

This application is a continuation of application Ser. No. 10/016,479, filed Dec. 7, 2001, now U.S. Pat. No. 6,776,049, issued Aug. 17, 2004.

BACKGROUND OF THE INVENTION

1. Field of the Invention

The present invention relates to instrumented sensors and to apparatus and methods for measuring or predicting stress and/or stress component(s) at an interface, such as a bond line, a joint, etc., of mated bodies.

2. Description of the Related Art

Various conventional means exist for joining two mechanical bodies together. By way of example, one or more pin members may be disposed through aligned and mating apertures of the mechanical bodies. Another example of a means for joining mechanical bodies together is adhesive, which may be applied along an adhesive bond line at the interface of the two mated bodies. Alternatively, adhesives may be used in combination with mechanical connectors, such as pin members.

Under operating conditions, a variety of forces act on the interface. For example, in the case of a bond line, these forces include normal forces acting perpendicular to a bond line and shear forces acting along the bond line.

Apparatuses and methods have been known for instrumenting a joint means to measure normal and shear stresses. For example, the use of various types of strain gauges to measure such forces are well known. Sensing devices are also known in which such strain gauges are used in combination with bridge circuitry such as a Wheatstone bridge.

The accurate measurement of shear forces exclusive of normal forces, however, has eluded effective measurement. Shear forces may be particularly insidious forces, especially along an adhesive bond line. It is often highly desirable to design a component or system so that shear forces and their detrimental effects can be minimized. The accurate measurement of shear forces often is particularly difficult, however, because the magnitude of the force can change, sometimes rapidly, over time and because shear forces are often accompanied by normal forces.

In the case of solid rocket motors, for example, there is an adhesive interface or bond line between the solid propellant grain and the insulated casing member. This adhesive interface is commonly referred to as a liner and is often made of polyurethane adhesives and the like. The liner functions to provide the bond between the propellant and casing insulation with adequate adhesive strength to ensure that the interfacial bond will be capable of withstanding all of the stresses to which the propulsion subsystem may be subjected during ignition, launch, maneuver, etc. The shear forces present during rocket motor operation, especially at launch, place great stress on the liner. Failure of the adhesive bond at the liner can lead to cracking or premature discharge of the solid propellant, thus compromising the rocket motor operation.

Preparation of adequate liner compositions and structures requires accurate modeling of shear loads experienced at the propellant-insulation interface. However, the accurate measurement of the shear loads in this environment has been difficult. Conventional shear sensors are sensitive to normal loads, temperature changes and other varying conditions, experienced during rocket motor operation. These outside influences can lead to inaccurate shear stress measurements.

BRIEF SUMMARY OF THE INVENTION

Accordingly, the present invention according to one aspect provides an instrumented sensor that can effectively measure stress or a stress component expected at an interface, especially an adhesive bond line or joint, of mated bodies. Another feature of this aspect is the measurement of shear stress substantially exclusive of stress normal to the interface.

The present invention according to another aspect provides a system comprising two mated bodies and an instrumented sensor that can effectively measure stress and a stress component expected at an interface, especially an adhesive bond line or a joint, of the mated bodies. Another feature of this aspect is the measurement of shear stress substantially exclusive of stress normal to the interface.

The present invention according to still another aspect provides a method for measuring stress and a stress component expected at an interface, especially an adhesive bond line or a joint, of mated bodies, particularly for measuring shear stress substantially exclusive of stress normal to the interface.

Additional advantages of the invention will be set forth in the description which follows, and in part will be apparent from the description, or may be learned by practice of the invention. The objects and advantages of the invention may be realized and obtained by means of the instrumentalities and combinations pointed out in the appended claims.

In accordance with the purposes of the invention as embodied and broadly described in this document, a stress sensor is provided. The sensor comprises a sensor body (or sensor housing), a sensing device, and, optionally, a sensor measurement signal output device. The sensor body comprises a first wall and a second wall coupled to one another, the first wall and second wall each having a respective portion ("opposing portions") opposing one another. The opposing portion of the first wall and the opposing portion of the second wall extend parallel to one another and are spaced apart from one another in a direction along a y-axis that is perpendicular to a central x-axis. The central x-axis extends parallel to and equidistant from the opposing portions of the first and second walls. The sensor body is resiliently deformable in response to a physical stress having a shear component and, optionally, a normal component. The shear component of the physical stress causes deformation of the sensor body by moving the first wall relative to the second wall along a direction generally parallel to the central x-axis. The optional normal component of the physical stress causes deformation of the sensor body by moving the first wall relative to the second wall along a direction parallel to the y-axis. The sensing device comprises first and second sensor elements, each extending between the opposing portions of the first and second walls for outputting sensor measurement signals representative of the physical stress. The first sensor element has a first longitudinal axis intersecting the central axis at a first oblique angle $\alpha$ and the second sensor element has a second longitudinal axis intersecting the central axis at a second oblique angle $-\alpha$. The arrangement of the first and second sensor elements permits measurement of the stress and, more preferably, a component (or components) of the stress. In a particular embodiment, from the sensor measurement signals, the shear component preferably can be determined substantially exclusive of the normal component. The sensor measurement signal output device outputs the sensor measurement signals from the sensor device.

The sensor body may comprise a metal or alloy, such as aluminum or aluminum alloys. Preferably, the sensor body consists essentially of aluminum.

The sensor body preferably comprises third and fourth walls spaced apart from and opposing one another and each extending in a respective plane parallel to the y-axis, the third and fourth walls coupling the first and second walls to one another to provide a block with a quadrangular cross-section (when in a nondeformed state). In one embodiment, the quadrangular cross-section is rectangular. In another embodiment, the quadrangular cross-section is rectangular and has a length-to-height ratio of about 4 to 1. In still another embodiment, the quadrangular cross-section is square. The sensor body may have an open chamber with a periphery bounded by the first, second, third, and fourth walls.

In another embodiment, the sensor body comprises third and fourth parallel walls spaced apart from and opposing one another, and fifth and sixth parallel walls spaced apart from and opposing one another. In this embodiment, the six walls form a block, preferably having an enclosed chamber bounded by six walls.

In another embodiment, the sensor body comprises at least first, second, third, and fourth walls forming a block with first and second pairs of diagonally opposed corners. The first sensor element comprises a first strain gauge having opposite ends respectively connected proximate to the first pair of diagonally opposed corners of the block to extend diagonally across the block. Likewise, the second sensor element comprises a second strain gauge having opposite ends respectively connected proximate to the second pair of diagonally opposed corners of the block to extend diagonally across the block and cross the first sensor element.

In the exemplary embodiments, the first and second sensor elements are strain gauges, each having a respective longitudinal axis. The first and second strain gauges are each arranged to undergo equal compression or extension along the longitudinal axes thereof representative of the normal component of the deformation stress applied to the sensor body. Also, the first strain gauge is arranged to undergo compression along the longitudinal axis thereof and the second strain gauge is arranged to undergo extension along the longitudinal axis thereof of equal magnitude (yet in opposite directions) representative of the shear component of the physical stress.

It is preferred that the first and second sensor elements each comprise a respective optical strain gauge, which are preferably symmetrical to each other across the x-axis. Preferred optical strain gauges undergo a corresponding deformation in response to a physical parameter to alter the optical characteristic of light signals being reflected therein or transmitted therethrough. The optical characteristics altered by the physical parameter may be selected from the group consisting of light intensity, phase, wavelength, and the like.

Where the sensor elements comprise optical fiber strain gauges, the sensor measurement signal output device preferably comprises an optical-to-electrical converter.

In accordance with another aspect of the invention, a system is provided for measuring stress at an interface, such as a bond line or a joint, between the first and second mated bodies. The system comprises the first and second mated bodies, a stress sensor situated at the interface, and a data-receiving device. Suitable stress sensors for the system of this aspect of the invention include, not necessarily by limitation, any and all of the stress sensors described or illustrated herein, either singularly or in plural. The sensor includes a sensor body having a first wall coupled to the first mated body and a second wall coupled to the second mated body, a sensing device, and a sensor measurement signal output device. The data-receiving device is operatively coupled to the sensor measurement signal output device for receiving sensor output signals.

Preferably, but optionally, the system comprises a plurality of the stress sensors. Also preferably, but optionally, the data-receiving device comprises at least one of a data processor and a data display.

The system of this aspect of the invention is useful in the context of measuring stresses imparted by physical loads in a rocket motor. For example, the first body may comprise a casing member or insulation layer of a rocket motor and the second body may comprise a solid propellant grain of the rocket motor. In this system, it is especially desirable to embed the sensor in the liner situated between the solid propellant grain and the insulated casing member.

In accordance with yet another aspect of the invention, a method is provided for measuring shear stress at an interface between first and second mated bodies. The method comprises disposing a stress sensor at the interface, such as an adhesive bond line or joint, between the first and second mated bodies. Suitable stress sensors for the method of this aspect of the invention include, but are not necessarily limited to, any and all of the stress sensors described or illustrated herein, either singularly or in plural. The sensor includes a sensor body, a sensing device, and a sensor measurement signal output device. A first wall of the sensor body is coupled to the first mated body and a second wall of the sensor body is coupled to the second mated body. The method further comprises sensing deformation stress applied to the sensor body and outputting sensor measurement signals representative of the deformation stress. In an especially preferred embodiment of this aspect of the invention, the sensor measurement signals are communicated to a data-receiving device, and the shear component of the deformation stress is capable of being determined substantially exclusive, and more preferably completely exclusive, of the normal component of the deformation stress.

Preferably, but optionally, the method comprises using a plurality of the stress sensors. Also preferably, but optionally, the data-receiving device comprises at least one of a data processor and a data display.

The method of this aspect of the invention is useful for measuring stresses imparted by physical loads in a rocket motor, such as during launch of the rocket motor. For example, the first body may comprise a casing member or, more likely, an insulation layer of a rocket motor, and the second body may comprise a solid propellant grain of the rocket motor. In this method, it is especially desirable to embed the sensor in the liner situated between the solid propellant grain and the insulated casing member.

BRIEF DESCRIPTION OF THE SEVERAL VIEWS OF THE DRAWINGS

The accompanying drawings, which are incorporated in and constitute part of the specification, illustrate presently preferred embodiments and methods of the invention and, together with the general description given above and the detailed description of the exemplary embodiments and methods below, serve to explain the principles of the invention.

FIG. 8 is a side sectional view of a reflective sensor element connected to a sensor measurement signal output device suitable for practice in various aspects of the invention.

FIG. 9 is a side sectional view of the reflective sensor element of FIG. 8 suitable for practice in various aspects of the invention.

DETAILED DESCRIPTION OF THE INVENTION

Figure 1:
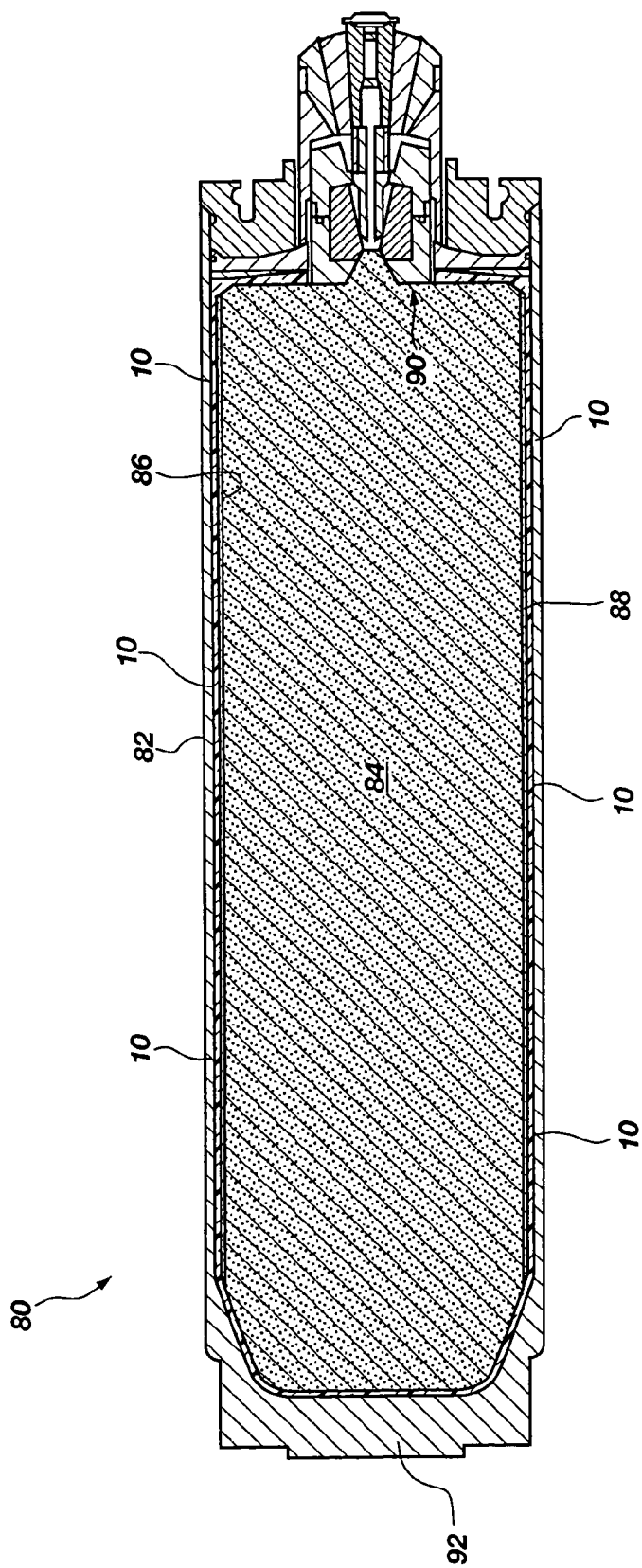
FIG. 1 is a sectional view of a rocket motor containing a solid propellant grain, in which a stress sensor according to an embodiment of the present invention has been incorporated to illustrate the principles and one of the possible applications of the invention.

Reference will now be made in detail to the exemplary embodiments of apparatus and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the exemplary embodiments and methods. The invention according to its various aspects is particularly pointed out and distinctly claimed in the attached claims read in view of this specification, and appropriate equivalents.

It is to be noted that, as used in the specification and the appended claims, the singular forms "a," "an," and "the" include plural referents unless the context clearly dictates otherwise.

In accordance with one aspect of the invention, one or more stress sensors may be used as part of a system or method for measuring shear stresses between mated bodies, such as at an interface (e.g., an adhesive bond line or joint). The instrumented sensor body or bodies preferably will take the general form, at least in size, shape, etc., to permit them to be incorporated at the interface of the mating bodies.

To illustrate these principles, a system for measuring shear stress between two mated bodies is shown in the context of a solid rocket motor 80 in FIG. 1. The illustrated solid rocket motor 80 is of the type described in U.S. Pat. No. 6,094,906. As shown in FIG. 1, the solid rocket motor 80 has casing member 82 and solid propellant 84. The solid rocket motor 80 may also comprise, and commonly does comprise, at least one insulation layer 88 formed or applied along the inner surface of the casing member 82 and protecting the casing member 82. The insulation layer 88 of the casing member 82 and the solid propellant 84 are joined and mated to one another by an adhesive liner 86. (In the event that the optional insulation layer 88 is omitted, the adhesive liner 86 typically functions as both bonding layer and insulation to adhere the solid propellant 84 to the casing member 82.) A nozzle 90, and more particularly a sliding nozzle assembly, is shown situated at the aft end of the casing member 82. The forward end of the casing member 82 is sealed with a closure member 92, which may be coupled to a forward payload (not shown). It is understood that the system and other aspects of this invention are not necessarily limited to the illustrated type of solid rocket motor having a sliding nozzle assembly. Rather, this system may be applied to other types of rocket motors, as well as to any mating bodies having a common interface.

Under normal operating conditions, especially during high acceleration flight stages of the solid rocket motor 80, such as during launch, the propulsive force of the rocket motor 80 creates a relatively large shear stress at the interface of the insulation layer 88 and the solid propellant 84, that is, along the adhesive liner 86.

Optionally but preferably, one or more stress sensors 10, e.g., as described more fully herein, can be situated at the propellant-insulation interface or propellant-casing interface so that when rocket motor 80 is fired, the stress sensors 10, again, for example, as described herein, can measure stress and stress components, and in particular shear stress, at the adhesive liner 86. A plurality of these instrumented stress sensors 10 may be disposed, for example, by uniformly distributing them around the inner circumference of the insulation layer 88, or in other predetermined arrangements. Preferably, the stress sensors 10 are embedded in the adhesive liner 86 so that opposite sides of the stress sensors 10 contact the insulation layer 88 and the solid propellant 84. The stress sensors 10 may be located at other positions, such as embedded in the insulation layer 88 or both the adhesive liner 86 and insulation layer 88 so as to contact the casing member 82 and said propellant 84.

The shear stress data and, in some instances, other data from the stress sensor or stress sensors 10 can be used to simulate, estimate or otherwise predict the same stresses that are occurring at the interface of the insulation layer 88/casing member 82 and the solid propellant 84. Fully understanding shear stresses at this interface permits satisfactory adhesive liners 86 to be selected with high confidence.

Figure 2:
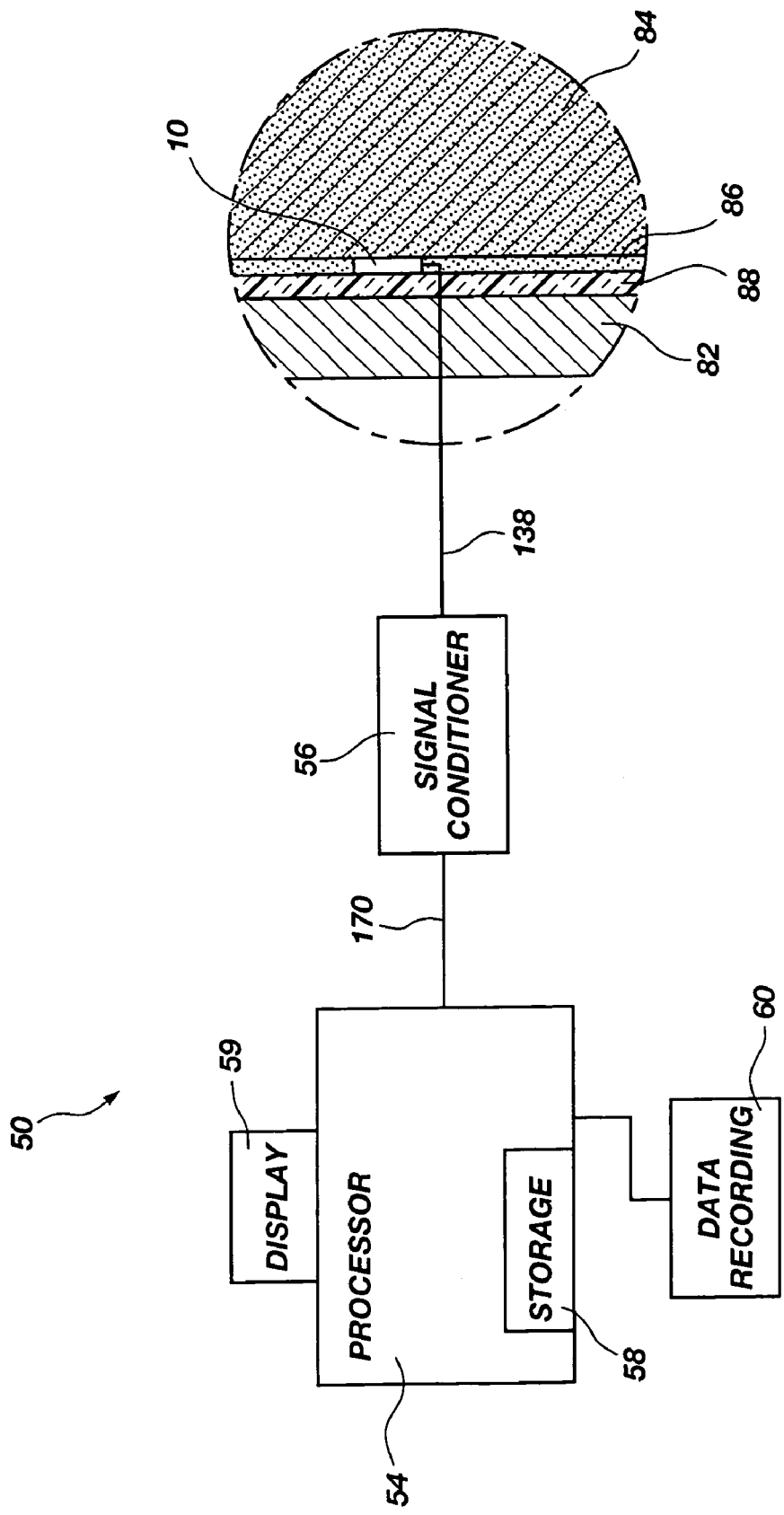
FIG. 2 is a block diagram of a system according to an embodiment of the invention.

FIG. 2 shows a functional block diagram of a system 50 in accordance with a presently preferred system embodiment of the invention, which would be suitable, for example, for predicting stresses in the stress sensors 10. The system 50 comprises at least one instrumented stress sensor 10 according to a presently preferred embodiment, in which the stress sensor 10 comprises a reflective sensing device. Each stress sensor 10 may be assumed, for purposes of reference and illustration, to be situated parallel to a longitudinal axis of the insulated casing member 82. Stress sensors 10, for example, may be distributed uniformly about the circumference of the annular interface of the insulation layer 88 and the solid propellant 84.

The system 50 also comprises a data-receiving device comprising a processor 54, such as the processor of a commercially available personal computer or small business computer, a display monitor 59, and a storage device 58, e.g., a hard drive on a computer. A data recording device 60, such as a strip chart recorder or other device useful for recording data from the stress sensors 10, may be electronically connected to the processor 54. A signal conditioner (also referred to herein as a sensor measurement output device) 56 is coupled between the stress sensors 10 and the processor 54 for communicating the sensor measurement output signals to the environment, e.g., the data-receiving device, outside of the instrumented sensor 10.

Figure 3:
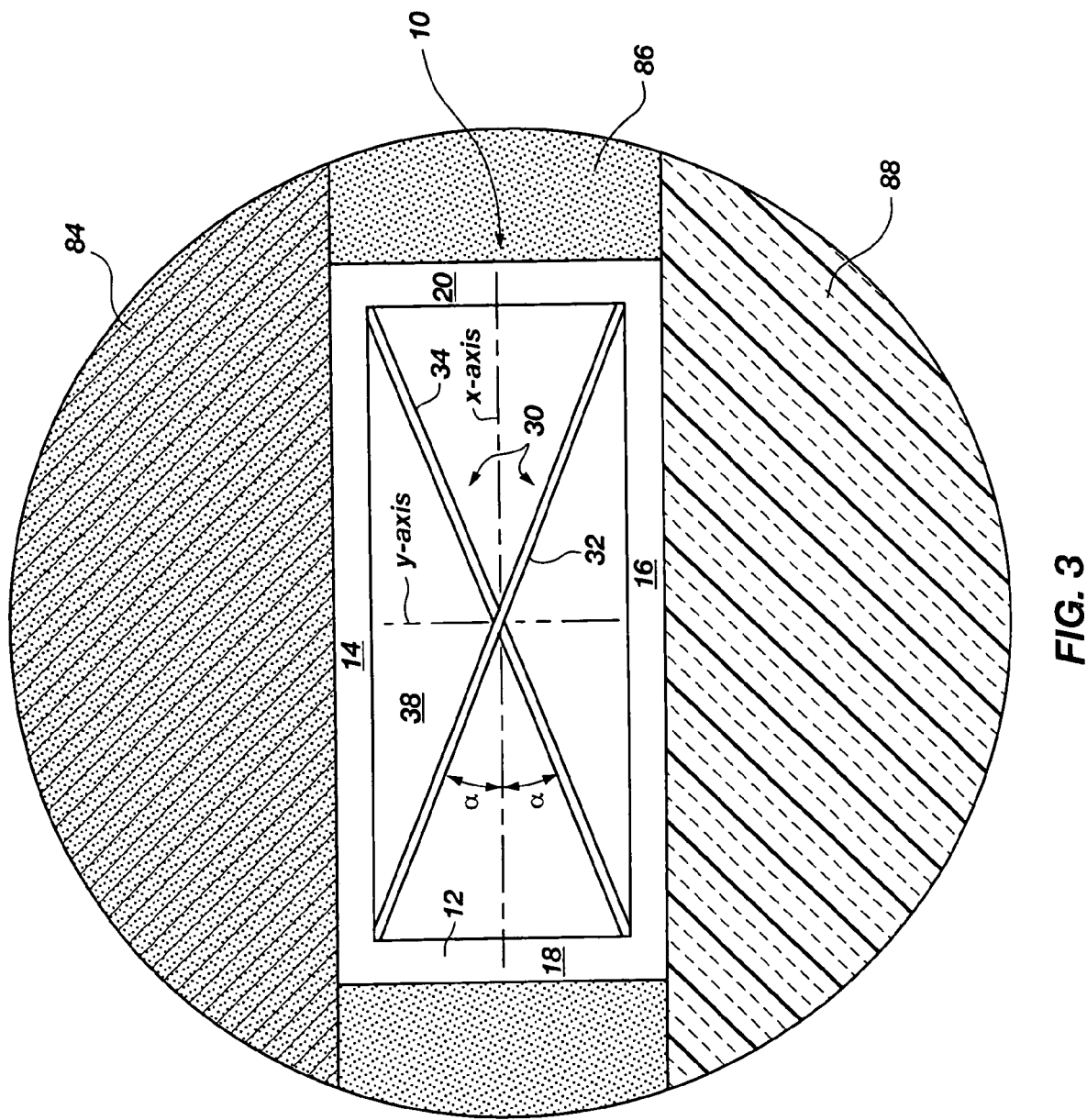
FIG. 3 is a side view of a stress sensor according to an embodiment of the present invention.

An instrumented stress sensor 10 according to a first presently preferred embodiment of this aspect of the invention is shown in side cut-away view in FIG. 3. The sensor 10 comprises a sensor body (or sensor housing) 12 including a first wall 14 and a second wall 16 coupled to one another. The first wall 14 and second wall 16 each have a respective portion opposing one another. The opposing portions of the first wall 14 and second wall 16 extend parallel to the interface of the insulation layer 88 and the solid propellant 84. Conventional adhesives, such as an epoxy, may be used for coupling the outer surface of the first wall 14 to the solid propellant and for coupling the outer surface of the second wall 16 to the insulation layer 88. To aid in illustration, a conventional three-axis Cartesian coordinate system may be assumed to exist at the sensor body 12. The x-axis of the Cartesian coordinate system is assumed to extend parallel to and equidistant from the opposing portions of the first and second walls 14 and 16. Mutually orthogonal y- and z-axes are assumed to lie in a plane normal to the x-axis, with the y-axis extending between the opposing portions of the first wall 14 and the second wall 16. (Although not shown, the z-axis extends out of the sheet on which FIG. 3 is illustrated.) The instrumented stress sensors 10, as described hereinbelow, each use a respective sensing device 30 to measure the stress in the sensor body 12, preferably a shear component of the stress in the sensor body 12. Optionally, the instrumented stress sensors 10 may also use the sensing device 30 to measure a normal component of the stress in the sensor body.

The opposing portions of the first wall 14 and the second wall 16 as referred to herein need not constitute the entirety of the first wall 14 and the second wall 16 that is subject to shear stresses. The opposing portions, however, do comprise at least a portion of the sensor body that is subject to stress, which in many cases will include the entireties of the first wall 14 and second wall 16. The opposing portions, as the term is used herein, refer to any area or region of the first wall 14 and second wall 16 that is suitable for measurement of shear stresses under the application and circumstances. Preferably, the opposing portions are selected to be regions of the sensor body that experience substantial stress relative to other parts of the sensor body during normal operating conditions and are representative of the stress occurring in the entire portion of the interface that is subject to such shear forces.

The illustrated sensor body 12 comprises a third wall 18 and a fourth wall 20 spaced apart from and opposing one another. The third wall 18 and fourth wall 20 each extend in a respective plane parallel to the y-z plane and couple the first wall 14 and second wall 16 to one another to provide a block having a chamber 38. The ratio of the length to the height of the sensor body 12 can be chosen to achieve the desired sensitivity characteristics. As illustrated, the sensor body 12 has a quadrangular cross-section and, more particularly, a rectangular cross-section with a length-to-height ratio of about 4 to 1. It is to be understood that the length-to-height ratio may be 1 to 1 (for increasing shear sensitivity) to give a square cross-section, or the sensor body 12 may have more than four sides and/or one or more nonlinear walls. The sensor body 12 may further comprise fifth and sixth walls extending parallel to the x-y plane and integrally coupled to the first, second, third and fourth walls to bound an enclosed chamber. Preferably, the walls of the sensor body 12 comprise aluminum and, more preferably, consist essentially of aluminum. Also preferably, the walls of the sensor body 12 all have the same thickness.

Further in accordance with this illustrated embodiment, the instrumented sensor 10 includes a sensing device 30 positioned at the sensor body 12 between the opposing portions of the first wall 14 and second wall 16 for sensing a shear-component stress on the sensor body 12 substantially exclusive of a net normal stress and for outputting a sensor measurement signal, e.g., a strain signal, representative of the shear stress. In preferred embodiments, such as those discussed below, the sensing device 30 is coupled to the sensor body 12 to undergo strain proportional to the stress applied to the sensor body 12. The sensing device 30 outputs strain sensor measurement signals that are proportional to the shear stress and the normal stress applied to the sensor body 12. As measured by the sensing device 30, the strain sensor measurement signals can be manipulated to determine the shear stress applied to the sensor body 12 substantially exclusive of a net normal stress. Stated differently, the sensing device 30 is capable of measuring stress on the sensor body 12 and apportioning appropriate amounts of the measured stress to the shear-component and to the normal component of the applied stress. This may be done, and in the presently preferred embodiments is done, using, among other things, a sensing device 30 wherein such net normal stress component is canceled out.

Although "substantially exclusive" preferably means completely exclusive, it is to be understood that the shear component reading may be influenced slightly by the normal component under certain circumstances. Examples of such circumstances include situations in which non-uniform deformation of the sensor body 12 occurs, such as when loads are applied non-uniformly across the sensor body 12, normal loads are disproportionately large in comparison to shear load (for example, a normal load to shear load ratio of 100:1), and the like. Under such circumstances, "substantially exclusive" may mean that the measured shear stress is not completely exclusive of and not totally uninfluenced by the normal stress. However, with the preferred embodiment the shear stress component may be measured without undue influence and, preferably, to the complete exclusion of the normal component.

The sensing device 30 according to this aspect of the invention comprises first reflective sensor element 32 and second reflective sensor element 34, each of which extends between the opposing portions of the first wall 14 and second wall 16. The first reflective sensor element 32 and second reflective sensor element 34 are coupled to first optical fiber 138 (FIG. 2). It should be understood, however, that the sensor elements 32 and 34 alternatively may be transmissive, with second optical fiber (140 in FIGS. 6 and 7) coupled to opposite ends of the sensor elements 32 and 34 relative to the optical fiber 138. The first sensor element 32 intersects the central x-axis at a first oblique angle $\alpha$, and the second sensor element 34 intersects the central x-axis at a second oblique angle $-\alpha$, which is equal in magnitude to the first oblique angle $\alpha$. For example, the oblique angle $\alpha$ may be about 6°. The first and second sensor elements 32 and 34 preferably are symmetrical across the central x-axis and, more preferably, form an "X" shape. The sensor elements 32 and 34 preferably lie in an x-y plane orthogonal to the z-axis.

The sensor elements 32 and 34 are positioned and affixed to the sensor body 12 by attaching or fastening them to the appropriate locations using appropriate fastening means. Such fastening means may include bonding the sensors using a suitable bonding agent, such as an epoxy or other adhesive. For example, GA-2, commercially available from Micro-Measurements, Measurement Group, Inc. of Wendell, N.C., may be a suitable bonding agent. As shown in FIG. 3, opposite ends of the first sensor element 32 are respectively connected tautly proximate to the first pair of diagonally opposed corners of the block to extend diagonally across the block. Likewise, opposite ends of the second sensor element 34 are respectively connected tautly proximate to the second pair of diagonally opposed corners of the block to extend diagonally across the block and cross the first sensor element 32. It is to be understood that this illustration is not necessarily limiting, in the sense that the ends of each of the sensor elements 32 and 34 may be connected to opposing wall portions not proximate to the corners.

Figure 4:
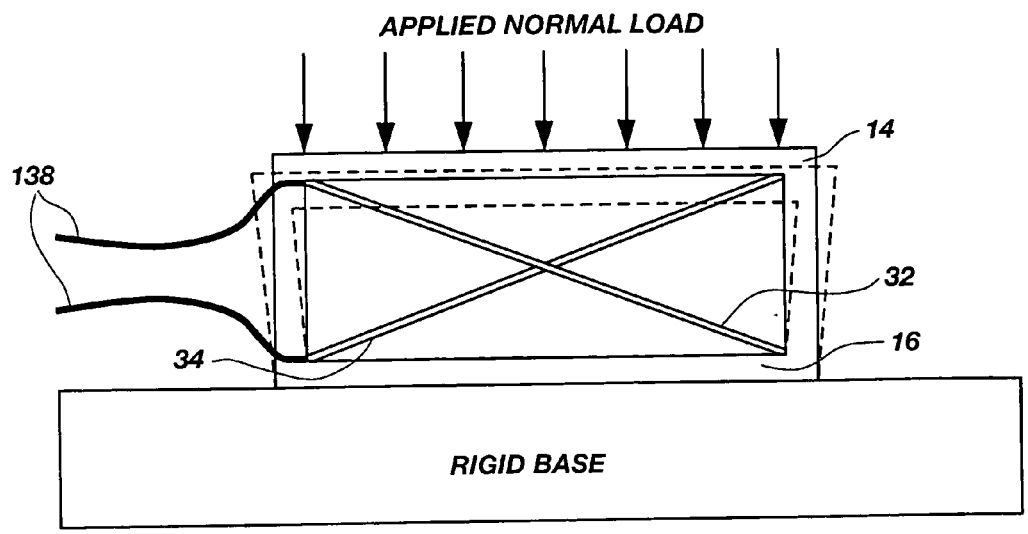
FIG. 4 is a side view of the stress sensor of FIG. 3, showing the sensor deformed by a normal component of a physical load.

Operation of the sensing device according to the preferred embodiments will now be described with reference to FIGS. 4 and 5. In these illustrative embodiments, the first and second sensor elements 32 and 34 are preferably strain gauges, more preferably optical fiber strain gauges. Referring to FIG. 4, application of a net positive normal load in the y-direction to the opposing portions of the first wall 14 and second wall 16 will cause the walls 14 and 16 to move toward one another along the y-axis, with the deformed sensor body 12 represented by the dashed lines. As the walls 14 and 16 move toward one another to reduce the spacing therebetween, the first and second sensor elements 32 and 34 undergo compressive strain and each sensor element 32, 34 outputs strain sensor measurement signals of equal magnitude representative of the net positive normal component of the deformation stress. On the other hand, application of a net negative (pulling) normal load to the first wall 14 and second wall 16 will increase the y-axis spacing between the walls 14 and 16. Movement of the walls 14 and 16 away from one another imparts a tension strain to the first sensor element 32 and second sensor element 34, each sensor element 32, 34 outputting strain sensor measurement signals of equal magnitude representative of the net negative normal component of the deformation stress.

Figure 5:
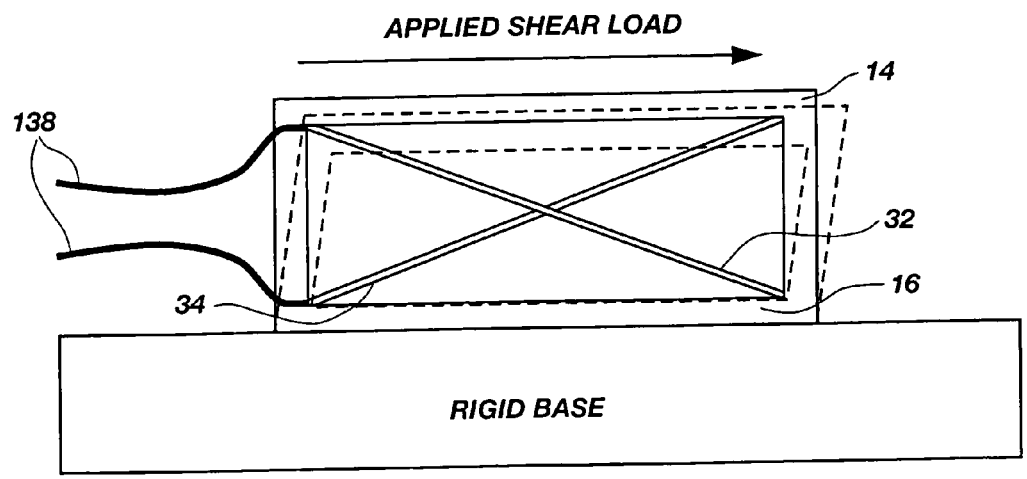
FIG. 5 is a side view of the stress sensor of FIG. 3, showing the sensor deformed by a shear component of a physical load.

Referring now to FIG. 5, application of a shear load to the sensor 10 of the illustrative embodiments will cause the opposing portion of the first wall 14 to move relative to the opposing portion of the second wall 16 along a direction generally parallel to the x-axis. By "generally parallel," it is understood that the shear load may also deform the sensor body 12 to move the opposing portions of the first wall 14 and second wall 16 slightly towards each other along the y-axis, as shown in FIG. 5. In FIG. 5, dashed lines represent the displaced sensor body 12. As referred to herein, relative movement may include displacement of (a) the first wall 14 while the second wall 16 remains fixed (as illustrated in FIG. 5); (b) the second wall 16 while the first wall 14 remains fixed; (c) the first wall 14 and the second wall 16 in opposite directions to one another; and (d) the first wall 14 and the second wall 16 in the same direction but by different magnitudes from one another.

The relative displacement of the first wall 14 and the second wall 16 caused by the shear stress places the first sensor element 32 under compressive strain and the second sensor element 34 under tension strain. The compressive strain sensor measurement signal reported by the first sensor element 32 will be of equal magnitude, yet of opposite sign, to the tension strain sensor measurement signal reported by the second sensor element 34.

Once the strain sensor measurement signals are obtained from the sensor elements 32 and 34, the shear component of the stress on the sensor 10 can be determined as follows, preferably in the processor 54 or its equivalent. The difference in the outputs of the sensor measurement signals from the sensor elements 32 and 34 yields a strain signal that is proportional to the magnitude of the shear stress in the sensor body 12. In the event that the sensor is subject to a load having a shear component and a normal component, the shear component may be calculated to the exclusion of the normal component. That is, because the proportion of the strain sensor measurement signals attributable to the normal stress acting on the sensor body 12 are virtually identical for each of the sensor elements 32 and 34, subtracting the outputs of the sensor measurement signals will cancel the normal component of the stress, leaving an output signal representing only the shear component. Additionally, any other environmental stimulus that affects both sensor elements 32 and 34 equally, such as thermal changes, will also be subtracted out in this way because the environmental stimulus will generally impart equal compression or tension to both of the sensor elements 32 and 34.

A signal proportional to the normal stress applied by the physical load can be obtained by adding the strain sensor measurement signals together. Addition of the strain sensor measurement signals effectively cancels out the proportions of the signals attributable to the shear stress acting on the sensor body 12. However, the resultant output will not be insensitive to environmental stimulus, such as thermal changes, that act primarily along a direction perpendicular to the bond line.

The sensor elements 32 and 34 may comprise any sensor or measuring device that can be affixed to the opposing wall portions of the sensor body 12 and can sense or measure strain in the appropriate directions as generally described herein. The specific sensor elements used in a particular application may depend upon a number of factors, such as the size of the interface of the insulation layer 88 and the propellant 84, the material from which the adhesive liner 86 is constructed, the nature and extent of the anticipated forces on the interface and sensor, the durability and requirements of the sensor or sensors with respect to the specific application and operational environment, other equipment with which the device is to be used, etc.

Strain gauges are preferred, and optical fiber strain gauges are especially preferred, as the sensor elements 32 and 34. In the exemplary embodiments, each of the sensor elements may comprise an optical fiber strain gauge, such as non-compensated strain gauge Model FOS-N-1000@+1000, commercially available from Fiso Technologies of Quebec, Canada. The structure, operation, and use of suitable Fabry-Perot type sensor elements are described in U.S. Pat. No. 5,202,939 and U.S. Pat. No. 5,392,117, both to Belleville, et al. Other strain gauges, such as those available from Luna Innovations, may also be used.

The following discussion of embodiments of the Fabry-Perot type of optical fiber strain sensors is merely exemplary in nature, is not necessarily intended to limit the invention or its application or uses, and is largely reproduced from U.S. Pat. No. 5,392,117.

Figure 6:
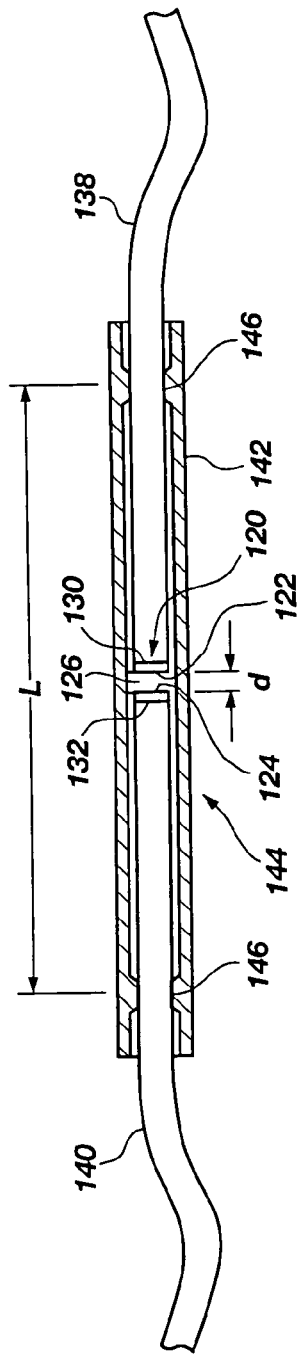
FIG. 6 is a side sectional view of a transmissive sensor element suitable for practice in various aspects of the invention.
Figure 7:
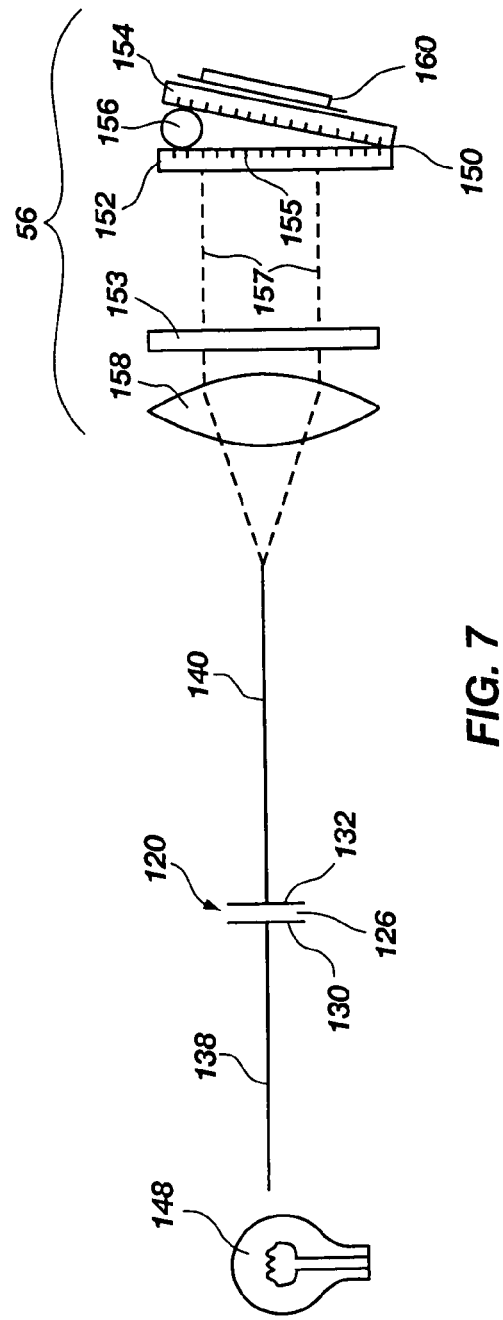
FIG. 7 is a side sectional view of the transmissive sensor element of FIG. 6 connected to a sensor measurement signal output device suitable for practice in various aspects of the invention.

The sensing device according to one preferred embodiment of the invention comprises the transmissive Fabry-Perot type of optical fiber strain sensor, such as shown in FIGS. 6 and 7, reproduced from U.S. Pat. No. 5,392,117. A transmissive Fabry-Perot interferometer 120 comprises two planar, parallel, reflecting surfaces 122 and 124 spaced apart from one another by some distance "d." A Fabry-Perot cavity 126 is defined between the reflecting surfaces 122 and 124. A light signal is fully transmitted if the cavity length "d" is an integer number of half wavelength, while the other wavelengths are partly reflected. A light plane wave propagated along the normal of two mirrors 130 and 132 will be partially transmitted, the rest being reflected (losses can be neglected). The transmittance or reflectance function T, defined as the ratio of the transmitted intensity to the incident intensity, of such a Fabry-Perot cavity 126 is given by the following relation:

$$T(\lambda,d)=1/(1+F\cdot\sin^2[2\pi nd/\lambda])$$

where:
   d is the distance separating the mirrors 130 and 132 (cavity length);
   n is the refractive index of the material separating the two mirrors 130 and 132 (for example, for air n=1);
   λ is the wavelength of the light signal; and
   F (the finesse) is equal to $[4R/(1-R)]^2$, R being the reflectance of the mirrors 130 and 132.

For a Fabry-Perot interferometer 120 made up of two mirrors 130 and 132 of a given reflectance R, the finesse F is evidently constant. On the other hand, the cavity length d as well as the wavelength λ of the light signal propagated through the Fabry-Perot interferometer 120 can vary. Consider a Fabry-Perot interferometer 120 with a fixed gap. As calculated with the above equation, the transmittance or reflectance T as a function of wavelength λ takes the form of a sinusoid with a wavelength's increasing period. If the cavity length d varies, the sinusoid will be subjected to a phase shift accompanied by a variation of the period. For a given cavity length d, the transmittance or reflectance T of a Fabry-Perot interferometer 120 as a function of the wavelength λ is unique. The transmittance or reflectance function T can thus be qualified as a signature of the cavity length d, and this is true for each value of cavity length d. Therefore, the Fabry-Perot cavity length d can be calculated from the transmitted (or reflected) light spectrum.

The transmissive Fabry-Perot interferometer 120 of FIG. 6 is used for measuring a strain parameter by providing a microcapillary or sleeve 142 having a longitudinal bore in which the mirrors 130 and 132 of the Fabry-Perot interferometer 120 are mounted. A first (leading) optical fiber 138 and a second (collecting) optical fiber 140 each have a tip connected to a corresponding one of the mirrors 130 and 132, a portion extending outside the bore, and a weld with the microcapillary 142. Opposite ends of the microcapillary 142 are bonded to a body or bodies whose deformation or strain is to be measured. As the body or bodies are subject to deformation or strain, the microcapillary 142 is elongated to change the distance d between the mirrors 130 and 132. Change in the distance d varies the transmittance or reflectance properties of the Fabry-Perot cavity 126. In the illustrated embodiment, the two optical fibers 138 and 140, having their tips polished at right angles and coated with the 30% semireflective thin-layer mirrors 130 and 132, are inserted into the quartz microcapillary 142. The Fabry-Perot cavity 126 is situated between the mirrors 130 and 132 deposited on the tips of the optical fibers 138 and 140. The optical fibers 138 and 140 are then welded at the end of the microcapillary 142, such as either by a $CO_2$ laser or an electric arc. The use of a $CO_2$ laser allows precise control of the gauge-making process, necessary to obtain reproducible results at advantageous manufacturing costs. If such a strain gauge 144 formed by the Fabry-Perot interferometer 120 with the microcapillary 142 is bonded to the above-mentioned body or bodies, the variation of the Fabry-Perot cavity length d due to the deformation of the body can be translated in strain measurement. The gauge length L, defined as the distance separating the welds 146, determines the sensitivity of this strain gauge 144. The whole elongation of the microcapillary 142 in the gauge length region being completely transferred to the Fabry-Perot cavity length d, the sensitivity of the strain gauge 144 increases with an increasing gauge length L. The sensitivity, and inversely the range of strain, can be therefore adjusted by a proper gauge length L.

As shown in FIG. 7, an optical sensing device containing the sensor element of FIG. 6 is operatively coupled to the signal conditioner (sensor measurement signal output device) 56. The signal conditioner 56 comprises a light source 148 for generating light signals, such as a multiple frequency light signal having predetermined spectral characteristics. The signal conditioner 56 further comprises an optical focusing lens 153 (such as a cylindrical lens) for focusing at least a portion of the light signal leaving the Fabry-Perot interferometer 120, and a Fizeau interferometer 150 through which the focused light signal is passed. The first optical fiber 138 is optically coupled with the light source 148 for transmitting the light signal into the Fabry-Perot cavity 126, and the second optical fiber 140 is optically coupled to the optical sensing device for transmitting light signals from the Fabry-Perot cavity 126.

A preferred embodiment of the sensor measurement signal output device 56 is illustrated in FIG. 7, although the sensor measurement signal output device may take other forms, depending upon the application, etc. In the illustrated embodiment, the sensor measurement signal output device 56 comprises a focusing lens 153 for collecting the portion of the outgoing light signal received by the second optical fiber 140. Preferably, the optical fibers 138 and 140 are multimode optical fibers. The Fizeau interferometer 150 includes an optical wedge forming a wedge-profiled Fizeau cavity 155 from which exits a spatially spread light signal indicative of the spectral characteristics resulting from the Fabry-Perot interferometer 120. Thereby, the physical parameter can be determined by means of the spatially spread light signal.

In operation, the luminous flux emitted by the light source 148 (formed, for example, by a quartz-halogen lamp or a broadband LED) is transmitted into the first optical fiber 138. The light beam propagated inside the first optical fiber 138 goes through the Fabry-Perot interferometer 120 to be partially transmitted into the second optical fiber 140 and partially reflected into the first optical fiber 138. By measuring the transmitted light spectrum X(λ) or the reflected light spectrum equal to 1−X(λ), the length d of the Fabry-Perot cavity 126 can be calculated. The calculation can be accomplished by cross-correlating the measured spectrum X(λ) with the theoretical transmittance function T(λ,d) given by the above equation. The cross-correlation coefficient is then calculated as a function of the cavity length d with the following relation:

$$C(d) = \frac{1}{M} \cdot \sum_{n=0}^{M-1} X(\lambda_0 + n\Delta\lambda) \cdot \frac{1}{1 + F \cdot \sin^2\left[\frac{2\cdot\pi\cdot n\cdot d}{\lambda_0 + n\Delta\lambda}\right]}$$

where the effective cavity length d is given by a maximal cross-correlation coefficient $C(d)_{max}$.

However, the measurement of the transmitted (or reflected) light spectrum needs sophisticated apparatus on one hand, and the calculation of the cross-correlation function is very time consuming on the other hand. To overcome those deficiencies, a method has been developed for instantaneously providing the cross-correlation function C(d) by means of an optical cross-correlator. This optical cross-correlator is merely the Fizeau interferometer 150. The Fizeau interferometer 150 consists of two flat glass plates 152 and 154, each having one face with the same reflecting properties as the mirrors 130 and 132 of the Fabry-Perot interferometer 120. The reflecting face of the two flat glass plates 152, 154 are brought closer to form an air wedge. The distance between those reflecting faces may vary, for example, from 0 µm to 40 µm, the wedge being determined by the spacer 156. To improve the robustness of the Fizeau interferometer 150, the latter can also be made by laying down on the plate 154 a thin layer of $Al_2O_2$ or any other suitable dielectric material of variable width profiled as a wedge, instead of the other plate 152. The Fizeau interferometer 150 works like a cross-correlator with a cavity length depending on the position on the wedge. For example, the light intensity transmitted through the Fabry-Perot interferometer 120 having a cavity length d of 25 µm will be maximally transmitted by the Fizeau interferometer 150 exactly at the position where the distance between the flat glass plates 152 and 154 equals 25 µm. If the Fabry-Perot cavity length d of the optical sensing device varies in response to a mechanical deformation, the position on the Fizeau interferometer 150 of the maximally transmitted light intensity will shift. Therefore, the parameter to measure can be easily determined with respect to a shift which has occurred in the maximally transmitted light intensity.

The cross-correlation is instantaneously produced by illuminating the whole width of the Fizeau interferometer 150. This goal is achieved by focusing the light signal outgoing from the second optical fiber 140 on a line (limited between the dotted lines 157) by means of the focusing lens 153, thereby affecting the light signal (which exits the second optical fiber 140 with a circular geometry) only along one of its axes. Although not essential, the optical sensing device can be further provided with a collimating lens 158 (such as a spherical lens) for collimating the light signal or reducing its divergence. In that case, the collimating lens 158 is optically coupled between the second optical fiber 140 of the Fabry-Perot interferometer 120 and the focusing lens 153. The light signal transmitted through the Fizeau interferometer 150 is then detected by a photodetector 160 (optical-to-electrical converter) positioned for receiving the spatially spread light signal outgoing from the Fizeau cavity 155 for generating a set of discrete electrical signals representing the spatially spread light signal. The electrical signals are then communicated along lead wire 170 (FIG. 2) to the processor 54.

This photodetector 160 can be, for example, a linear photodiode array or a CCD array. Therefore, the cross-correlation function C(d) is coded on the pixels of the photodetector 160, each pixel corresponding to a given correlated Fabry-Perot cavity length d. The cavity length d may vary, for instance, from 0 µm to 40 µm. The cavity length d of the Fabry-Perot interferometer 120 is finally given by the position of the pixel reading the maximum light intensity. The detection of the maximum can then be translated in strain by means of the following relation:

$$\varepsilon = \frac{\Delta L \cdot \tan(\gamma)}{L}$$

where:
 ΔL is the distance on the photodetector 160 separating the unstrained coefficient of maximum cross-correlation from the strained coefficient;
 γ is the angle between the flat glass plates 152, 154 of the Fizeau interferometer 150 (approximately 0.03°); and
 L is the gauge length of the Fabry-Perot interferometer 120.

Additional details concerning the structure, operation, and modifications of the Fabry-Perot type of optical fiber strain sensor and the sensor measurement signal output device 56 are described in U.S. Pat. No. 5,392,117.

In accordance with an alternative embodiment, an optical sensing device in reflection is also proposed. Referring to FIGS. 8 and 9, the configuration of such an optical sensing device in reflection comprises an optical coupler 149 optically coupled between the first optical fiber 138, the focusing lens 153 and the light source 148, for coupling the light signal into the optical fiber 138 and for coupling the reflected portion of the light signal collected from the Fabry-Perot cavity 126 and transmitted by the optical fiber 138 into the focusing lens 153. As shown in FIG. 9, the reflective configuration also allows the development of a thermally auto-compensated optical sensing device. The optical fiber 138 is inserted in one end of the microcapillary 142 and a thin wire 162 made of the same material as the body whose deformation is to be measured (not shown in the Figure) is inserted in the other end of the microcapillary 142. The tip of the wire 162 is coated with at least a partially light-absorbing material 164, such as Inconel®, which exhibits a reflectance of nearly 30% in order to form a mirror (as shown in FIG. 9), while absorbing the rest of the light signal. The optical fiber 138 cannot move in the bore of the microcapillary 142 since its tip 166 is welded thereto, while the portion 168 of the wire 162 within the bore of the microcapillary 142 can move freely. The gauge length L is entirely in the region of the portion 168 of the wire 162. A mechanical deformation will produce a variation of the cavity length d in a similar way as described earlier. On the other hand, a thermal expansion of the body (not shown in the Figure) will be compensated by a similar thermal expansion of the portion 168 of the thin wire 162 moving in the opposite direction in the bore. The optical sensing device may be compensated for different material by changing the material of the thin wire 162 as well.

The system further includes a data-receiving device operatively coupled to the sensor measurement signal output device for receiving the sensor output signal. Preferably but optionally, the data-receiving device comprises a processor 54. It also may comprise a display monitor 59, a storage device 58, a strip chart data recording device 60, or any other device or collection of devices suitable for receiving, storing, processing, and/or displaying or presenting the data embodiment in the sensor signal. As implemented in the presently preferred embodiments, the data-receiving device comprises the components illustrated in FIG. 2 and as described above.

The sensor 10 is then calibrated by first adjusting the processor 54 to set the shear and normal stresses at preload to be under the preload conditions. The specific manner in which calibration is done will depend upon the specific processor and other equipment that comprises the system 50, but will be readily understood by those of ordinary skill in the art.

In accordance with another aspect of the invention, a method is provided for measuring stress, including a stress component (or stress components) at an interface. In the interest of brevity, this aspect of the invention will be described with reference to the preferred and illustrated embodiments above.

According to an embodiment of this method, a stress sensor is disposed at the interface between the first and second mated bodies. The stress sensor may comprise a sensor body comprising a first wall coupled to the first mated body and a second wall coupled to the second mated body, with the first wall and second wall each having a respective portion opposing one another. The opposing portion of the first wall and the opposing portion of the second wall extend parallel to a central x-axis and are spaced apart from one another along a y-axis that is perpendicular to the central x-axis, the central x-axis extending parallel to and equidistant from the opposing portions of the first and second walls. The sensor body is resiliently deformable for permitting movement of the first wall relative to the second wall along a direction parallel to the x-axis in response to a shear stress component and for permitting movement of the first wall relative to the second wall along a direction parallel to the y-axis in response to the normal stress component. The stress sensor used in this embodiment further comprises a sensing device comprising first and second strain gauges, each having opposite ends respectively connected to the opposing portions of the first and second walls to extend the first and second elastic strain gauges between the first and second walls. The first strain gauge intersects the central axis at a first oblique angle $\alpha$ and the second strain gauge intersects the central axis by a second oblique angle $-\alpha$. The stress sensor used in this embodiment still further comprises a sensor measurement signal output device. According to a preferred embodiment, the deformation stress applied to the sensor body is sensed and sensor measurement signals representative of the deformation stress are outputted. The sensor measurement signals may then be communicated to a data-receiving device for determining the stress or stress component. Preferably, the shear component is determined substantially exclusive of the normal component.

The invention, as noted, is not necessarily limited to the specific embodiments and illustrations described and shown herein. The description above in terms of a rectilinear coordinate system (x, y, z), for example, has been used merely to better illustrate the preferred embodiments and the related principles of the invention. It, of course, will be understood and appreciated by persons skilled in the art that other coordinate systems also could be used, and that translations of such coordinate systems to and from a rectilinear coordinate system are possible.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. An apparatus for measuring stress at an interface comprising a stress sensor, the stress sensor including:
   a sensor body having a central x-axis and a y-axis perpendicular to the central x-axis, opposing first and second portions of the sensor body being resiliently deformable with respect to one another along a direction generally parallel to the central x-axis in response to a shear component of a stress and along a direction generally parallel to the y-axis in response to a normal component of the stress; and
   a sensing device configured for generating sensor measurement signals representative of the stress, the sensing device comprising first and second sensor elements each extending between the opposing first and second portions of the sensor body, the first sensor element having a first longitudinal axis intersecting the central x-axis at a first oblique angle $\alpha$ and the second sensor element having a second longitudinal axis intersecting the central x-axis at a second oblique angle $-\alpha$.

2. The apparatus of claim 1, wherein the opposing first portion of the sensor body of the stress sensor and the opposing second portion of the sensor body of the stress sensor are coupled to one another and extend parallel to and spaced apart from one another along the y-axis, and wherein the central x-axis extends parallel to and equidistant from the opposing first and second portions of the sensor body.

3. The apparatus of claim 2, wherein the sensor body of the stress sensor further comprises third and fourth opposing portions spaced apart from and opposing one another and each extending in a respective plane parallel to the y-axis, and wherein the opposing third and fourth portions couple the opposing first and second portions to one another to provide a block having a quadrangular cross-section.

4. The apparatus of claim 3, wherein the quadrangular cross-section of the block is rectangular.

5. The apparatus of claim 3, wherein the sensor body of the stress sensor further comprises a chamber having a periphery bounded by at least the first, second, third, and fourth portions of the sensor body.

6. The apparatus of claim 3, wherein:
   the block has first and second pairs of diagonally opposed corners;
   the first sensor element of the sensing device comprises a first strain gauge having opposite ends respectively coupled proximate the first pair of diagonally opposed corners to extend diagonally across the block; and
   the second sensor element of the sensing device comprises a second strain gauge having opposite ends respectively coupled proximate the second pair of diagonally opposed corners to extend diagonally across the block crossing the first sensor element.

7. The apparatus of claim 1, wherein the first and second sensor elements of the sensing device comprise first and second strain gauges, respectively.

8. The apparatus of claim 7, wherein the first and second strain gauges comprise first and second optical strain gauges, respectively.

9. The apparatus of claim 8, wherein:
   the first and second optical strain gauges are both configured to undergo equal compression or extension along the respective longitudinal axes thereof representative of the normal component of the stress; and
   the first optical strain gauge is configured to undergo compression along the longitudinal axis thereof and the second optical strain gauge is configured to undergo extension along the longitudinal axis thereof, the compression and extension being representative of the shear component of the stress and being of equal magnitude with respect to one another.

10. The apparatus of claim 1, wherein the stress sensor is configured to measure the shear component of the stress substantially exclusive of the normal component of the stress.

11. The apparatus of claim 1, wherein the stress sensor further comprises a sensor measurement signal output device configured for outputting the sensor measurement signals generated by the sensing device.

12. The apparatus of claim 11, wherein the sensor measurement signal output device of the stress sensor comprises an optical-to-electrical converter.

13. The apparatus of claim 12, wherein the sensor measurement signal output device of the stress sensor further comprises a light source.

14. The apparatus of claim 11, further comprising:
   a first body;
   a second body mated to the first body at the interface, wherein the stress sensor is situated at the interface, and wherein at least a portion of the opposing first portion of the sensor body is coupled to the first body and at least a portion of the opposing second portion of the sensor body is coupled to the second body; and
   a data-receiving device operatively coupled to the sensor measurement signal output device of the stress sensor and configured for receiving the sensor measurement signals output by the sensor measurement signal output device.

15. The apparatus of claim 14, wherein the data-receiving device is further configured for determining the shear component of the stress substantially exclusive of the normal component of the stress.

16. The apparatus of claim 14, further comprising a plurality of the stress sensors situated at the interface.

17. The apparatus of claim 14, wherein the data-receiving device comprises at least one of a data processor and a data display.

18. A method for measuring stress at an interface between first and second mated bodies in response to a stress having a shear component and a normal component, the method comprising:
   disposing a stress sensor at the interface between the first and second mated bodies;
   resiliently deforming at least a portion of the stress sensor in response to the stress;
   measuring a first sensor measurement signal comprising a compressive strain sensor measurement signal portion and a tension strain sensor measurement signal portion, the compressive strain sensor measurement signal portion being equal in magnitude and opposite in direction relative to the tension strain sensor measurement signal portion; and
   outputting the first sensor measurement signal.

19. The method of claim 18, further comprising communicating the first sensor measurement signal to a data-receiving device and determining the shear component of the stress.

20. The method of claim 19, wherein communicating the first sensor measurement signal to a data-receiving device comprises communicating the first sensor measurement signal to at least one of a data processor and a data display.

21. The method of claim 18, further comprising communicating the first sensor measurement signal to a data-receiving device and determining the shear component of the stress substantially exclusive of the normal component of the stress.

22. The method of claim 18, further comprising disposing a plurality of the stress sensors at the interface between the first and second mated bodies.

* * * * *

UNITED STATES PATENT AND TRADEMARK OFFICE
CERTIFICATE OF CORRECTION

PATENT NO. : 7,077,011 B2 Page 1 of 1
APPLICATION NO. : 10/763486
DATED : July 18, 2006
INVENTOR(S) : Mont A. Johnson and Randy L. Everton It is certified that error appears in the above-identified patent and that said Letters Patent is hereby corrected as shown below:

On the title page:
In ITEM (56), References Cited, 1st page, 2nd column, immediately preceding "*Primary Examiner*," insert --OTHER PUBLICATIONS
Francis et al., Shear Stress Transducer Concepts, 1990
JANNAF Propulsion Meeting (1990).
International Search Report dated Feb. 28, 2003.--

Signed and Sealed this

Twenty-first Day of October, 2008

JON W. DUDAS
*Director of the United States Patent and Trademark Office*